July 6, 1965
T. S. FLEMING
3,193,674
EXTENSIBLE LIGHT FIXTURE
Filed Oct. 31, 1961
2 Sheets-Sheet 1
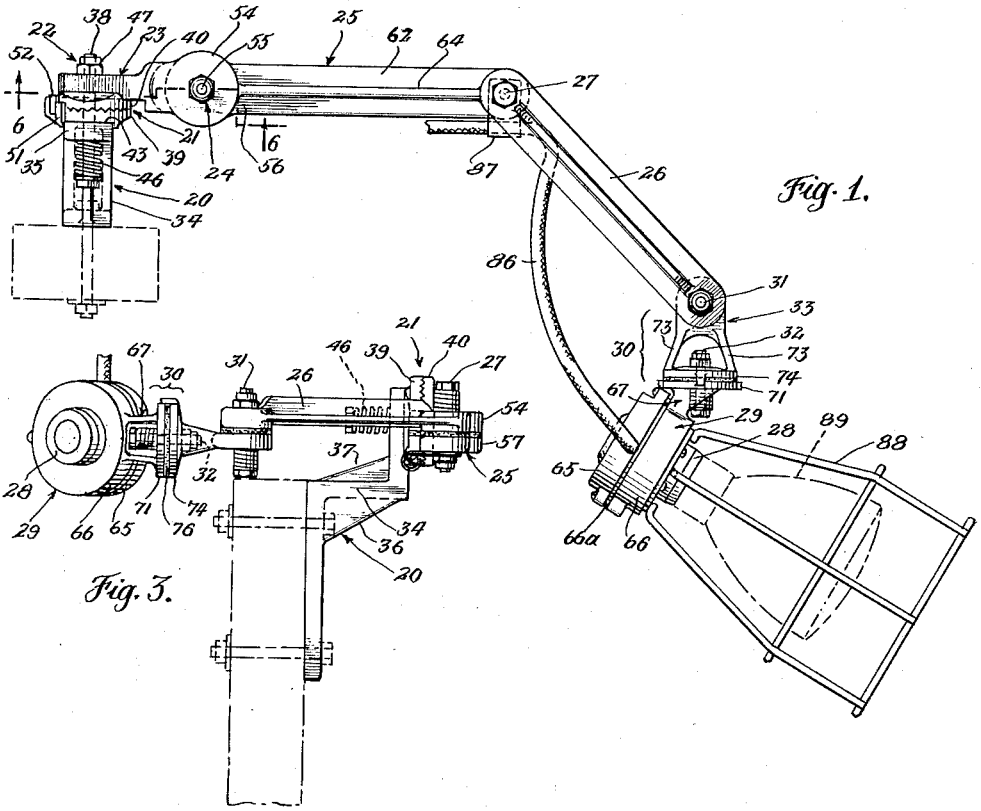
INVENTOR
Theodore Samuel Fleming
BY
ATTORNEYS

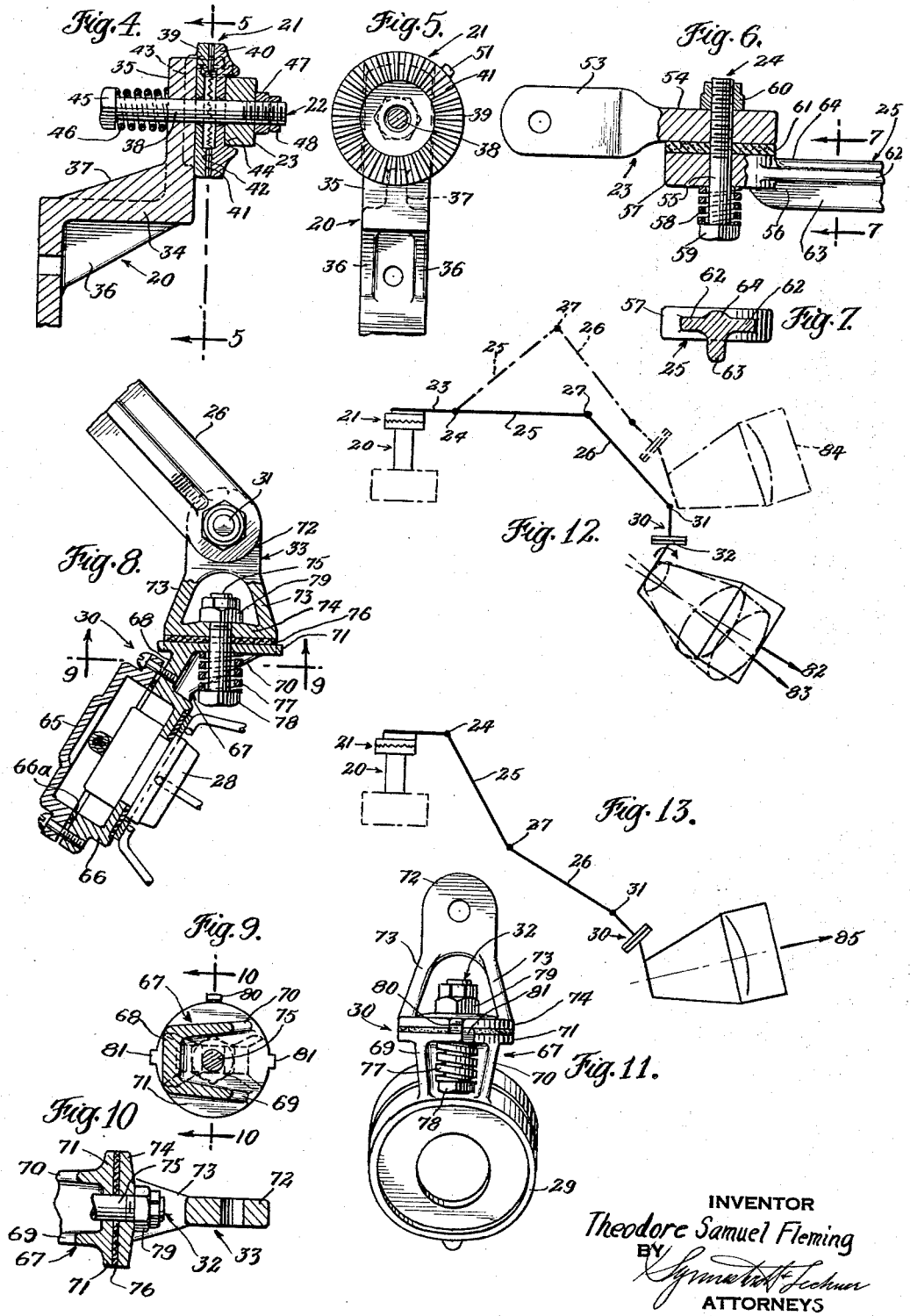

United States Patent Office 3,193,674
Patented July 6, 1965

3,193,674
EXTENSIBLE LIGHT FIXTURE
Theodore Samuel Fleming, 1912 Harte Road,
Jenkintown, Pa.
Filed Oct. 31, 1961, Ser. No. 148,883
10 Claims. (Cl. 240—52)

This invention relates to lighting fixtures, and has particular reference to that type of device in which a light receptacle is carried at the end of an articulated radius arm, the other end of which is adjustably mounted to a fixed support.

Fixtures of this type are especially useful to direct light towards an area not readily illuminated by other means. The device of this invention is especially useful in the trucking field, for illuminating the interior of a truck or trailer at a loading platform, from a light source permanently mounted on a platform wall or column. It has many other uses, however. One of these is lighting the work area of industrial machines, such as lathes and milling machines, etc., where the need for inserting and removing work pieces precludes the use of fixed lights.

Many proposals have been made for supporting light receptacles on articulated arms, in the past, but these, although generally quite helpful, afford insufficient adjustability or insufficient stability after adjustment. Movement about the articulated connections is likely to be such as to necessitate adjusting a plurality of pivots in order to shift the direction of the light beam to a new location, and with each movement, the risk increases that vibration or other factors may cause the supporting arm to shift out of position.

It is an object of this invention to provide an articulated light-supporting radius arm which can be easily and inexpensively manufactured and installed, and which, at the same time, has adequate strength and rigidity even for rugged use. Another objective is provision of a structure which will yield under accidental impact, instead of breaking.

Another object of the invention is to provide a fixture in which the light receptacle can be quickly moved to raise or lower the light with reference to the base support, but which positively supports the light at the desired elevation, while at the same time providing relatively greater freedom for swinging movement of the articulated arm segments.

Still further, a very important object is to provide maximum mobility to the light receptacle with minimum need to adjust the intermediate pivots.

How these and other objectives which will occur to those skilled in the art may be obtained, is illustrated in the accompanying drawings which picture a preferred embodiment of the invention, and in which—

FIGURE 1 is a plan view;
FIGURE 2 is a front view of FIGURE 1;
FIGURE 3 is an end view looking towards the left of the position shown in FIGURE 2;
FIGURE 4 is an enlarged cross section through a portion of the base mounting unit, taken on the line 4—4 of FIGURE 2;
FIGURE 5 is a section on the line 5—5 of FIGURE 4;
FIGURE 6 is a section on the line 6—6 of FIGURE 1;
FIGURE 7 is a section on the line 7—7 of FIGURE 6;
FIGURE 8 is an enlarged section on the line 8—8 of FIGURE 2;
FIGURE 9 is a section on the line 9—9 of FIGURE 8;
FIGURE 10 is a section on the line 10—10 of FIGURE 9;
FIGURE 11 is a fragmentary view showing the socket fitting rotated on its mounting arm 90° from the position shown in FIGURE 8;
FIGURE 12 is a diagrammatic view showing, in full lines, the fixture as illustrated in FIGURE 1, and showing in dotted lines, alternative positions which it may take; and
FIGURE 13 illustrates still another articulation.

The lighting fixture, broadly considered, comprises a fixed base bracket 20 on which is rigidly mounted a face clutch 21. Inboard pivot 22 forms a part of this clutch structure, and provides for angular movement of the short arm 23 about the common axis of the clutch and pivot. The inboard radius arm 25 is connected to the short arm 23 by oscillating pivot 24 and to the outboard radius arm 26 by intermediate oscillating pivot 27. The light socket 28 is mounted in the receptacle 29 which, in turn, is connected to the free end of the outboard radius arm 26 by a compound pivot structure 30. This compound pivot structure 30 includes an oscillating pivot 31 at the extreme end of the radius arm 26 and an angular pivot 32 which is connected to the pivot 31 by a bifurcated lobar element 33. It will be observed that the angular pivot axis 32 will always lie parallel to a plane containing the angular pivot axis 22, whereas the axes of all of the oscillating pivots 24, 27 and 31 will always be normal to that plane. Ipso facto, the axes of the oscillating pivots are parallel.

Turning now to the base mounting structure, best illustrated in FIGURES 1, 4 and 5:

The mounting bracket 20 is rebent at 34 to provide an upstanding offset buttress portion 35. The rebent section is stiffened and strengthened by spaced webs 36—36, and the buttress is strengthened and stiffened by a central web 37. The buttress itself is drilled to provide an arbor for a pivot pin 38 on which are mounted the clutch disks 39 and 40 of the face clutch 21. The working face of the clutch disk 39 is provided with radially extending teeth 41 and mating teeth 42 are formed on the working face of clutch disk 40. The back of the clutch disk 39 is provided with a shallow channel 43 (see FIGURE 1) which snugly engages the outer portion of the buttress 35.

The back of the movable clutch disk 40 is similarly channeled as at 44 (see FIGURE 4) to snugly engage a portion of the short arm 23 which, together with the clutch disks, is bored to provide an arbor for the pivot pin 38.

Between the head 45 of the pivot pin and the rear face of the buttress 35 a helical compression spring 46 is placed. This spring is loaded to any desired degree by means of the adjusting nut 47 which engages the threaded end of the pivot pin 38. The nut 47 is preferably locked in position, either by means of deformed threads in the cap piece 48 (as shown) or by a separate lock nut.

The teeth on the adjacent faces of the clutch disks 39 and 40 preferably have the proportions of an equilateral triangle in cross section, so that even though they interengage to afford a positive lock, severe loads on the outboard portion of the device will cause the disk 40 to ride up on the teeth of the disk 39, compressing the spring 46. It is desirable to provide motion limiting stops 51 and 52 in the peripheries of the respective clutch disks 39 and 40.

The mechanism just described will hold the entire lighting fixture in any desired position of angular adjustment with reference to the mounting bracket, against accidental impact and against vibration. It fulfills a positive locking function. Nevertheless, angular adjustment of the fixture so as to raise or lower the light is easily accomplished by pulling or pushing the short arm 23 slightly away from the fixed disk 39. This facilitates rotation of the movable disk with respect to the fixed disk. Alternatively, the angular position of the radius arm assembly can be changed simply by exerting sufficient force at the outboard end of the arm, compressing spring 46 and allowing relative rotation of the clutch disks before the radius arms reach the breaking point.

FIGURE 6 shows in enlarged form the structure of the inboard oscillating pivot 24. This is similar to the angular pivot 22 just above described. The short arm 23 is flattened and widened at its inner end 53 (to the left in FIGURE 6) to afford a broad bearing face against the back of the clutch disk 40. It is broadened and flattened at right angles to the plane of the inner end so as to merge into a bearing block 54 which is circular in plan. This is centrally bored to provide an arbor for the pivot pin 55. The inner end 56 of the radius arm 25 likewise merges into a bearing block 57, which is similarly bored. A helical compression spring 58 is mounted between the headed end 59 of the pivot pin and the adjacent face of the bearing block 57, and the spring is loaded by means of the adjusting nut 60, as in the case of pivot 22.

Between the pivot blocks 54 and 57 I place a friction disk washer 61. This is made of high friction material. I have found that washers made of asbestos mixed with synthetic rubber are especially effective for this use. Sheet material of this composition is obtainable from Keasbey & Mattison Company, under their catalog number 227–5.

FIGURE 7 shows a typical cross section of the radius arm 25, looking towards the bearing block 57. It will be seen that this arm is essentially a wide but thin strap, as indicated at 62. Rigidity is imparted to this strap by means of the longitudinally extending web 63 which merges into the pivot block at a point just short of the spring 58. Still further stiffening is obtained by slight thickening of the flat strap 62 in the central area 64 which lies opposite the web 63. The radius arm 26 has precisely the same cross section as arm 25, save only that it is inverted in position.

By inverting the webs on connected radius arms, it is possible to obtain a very high degree of stiffening, while at the same time keeping the weight extremely low, and also providing complete freedom for articulated swinging movement of one arm with respect to the other. Furthermore, this feature makes it feasible to provide interengaging pivot blocks, the thickness and lateral extension of which cause them to function as truss members, between the arm and the pivot pin, thereby mutually strengthening both.

It should be noted that the web 63 extends well in toward the center of the pivot block 57. This is an important structural characteristic, for without the extended fillet shown it is difficult to prevent breakage at this point under impact.

A very important feature of the present invention is the mounting arrangement for the light socket and receptacle, incorporating the compound pivot structure 30, previously mentioned. This is shown in some detail in the enlarged views of FIGURES 8–11.

The receptacle 29 is an all-weather housing, comprising a cover cup 65 and an outlet cup 66, adapted to mate with each other and preferably embracing a heat-resistant weather-tight washer 66a between their mating rims. The socket 28 is a standard outdoor fitting, mounted in the conventional way in the receptacle. However, the mounting for the receptacle is not at all conventional.

The mounting structure is formed by providing the receptacle with a lateral extension 67, comprising the mounting bar 68 and two spaced webs 69 and 70. These are configured to engage the back of a pivot disk 71, and to mount it at an angle to the plane of the receptacle—that is to say, at an angle to the plane of the mating rims of the cover and outlet cups. It will be seen that this mounting arrangement provides a free space or cavity between the spaced webs and between the back of the pivot disk and the adjacent wall of the receptacle.

The lobar element 33 has at one end a pivot block 72 which engages the outboard oscillating pivot 31, previously mentioned. This element 33 is bifurcated to provide two supporting legs, 73, 73, which, increasing in depth as they extend away from the block 72 (FIGURE 10), are configured to engage the back of a pivot disk 74, and position this disk with its front or working face in a plane which is normal to the axis of the oscillating pivot 31. The pivot disk 71, on the lateral extension from the receptacle, and the pivot disk 74 on the lobar extension are bored to provide an arbor for the angular pivot pin 75, which secures these pivot disks together with a friction washer 76 between them. This pivot itself is similar to the others, having a compression spring 77 between the pivot pin head 78 and the back of the pivot disk 71, and having a loading nut 79 at its other end.

Motion limiting stops 80, 81 are preferably mounted on the periphery of the pivot disks 74 and 71, respectively.

It will be apparent to those who have experience in this field that the mounting arrangements for the light receptacle just described make it possible to satisfy some very severe space limitations, and at the same time secure a striking advantage, namely, mounting the receptacle in such a way that it is capable of angular movement with reference to the oscillating pivots, especially the outboard pivot 31. The space between the legs of the bifurcated lobar element, and the cavity between the spaced webs 73, 73, together solve the very troublesome problem of providing a space within which a spring-loaded pivot can be accessibly housed, without sacrificing the advantages which arise from the use of pivot disks in this crucial location. Right at the point where the receptacle joins the outboard end of the radius arm is where prior art devices fail. Simple pivots will not do. Vibration at the extreme limit of the lever arm is too severe. Yet it is equally unsatisfactory to use extension braces, long pivot rods, or similar expedients, because these do not hold the light surely and positively in the desired position, or else they weigh so much that the base mounting of the radius arm cannot keep them in place.

FIGURES 12 and 13 illustrate diagrammatically some advantages which flow from the present invention. Assume that the light, positioned as shown in solid lines in FIGURE 12, is so positioned that the focal beam 82 will strike the forward end of a trailer at about the mid-point, vertically, of the right side. As the loading is removed, it becomes desirable to see what is at floor level in the right front lower corner. All that need be done is to rotate the light on the angular pivot 32, for this will not only lower the target area, it will also shift the beam laterally, as at 83, because the receptacle itself is at an angle to the pivot axis about which it turns.

Without this angularity, it would be necessary to shift not only the elevation of the beam, but also the horizontal direction of it, and this would inescapably require adjusting at least one additional pivot. This may seem to be a trifling matter, but it means that the stevedore must drop whatever he has in either hand, for it takes two hands and full attention to adjust two pivots in relation to each other, whereas only one hand and an instinctive movement will achieve the desired result with this invention.

When the job is done, the whole unit may be simply pushed aside, to the dotted-line position indicated at 84, and the three oscillating pivots, having all axes parallel, make this so easy that it is almost instinctively done.

FIGURE 13 shows how easy it is to focus the beam 85 on the opposite corner, simply by pulling the intermediate pivot 27 into an inward position.

It may also be noted that the fixture of the present invention, being supplied with a pair of pivot blocks at every one of its oscillating pivots, is unusually stable in all positions of adjustment. The same truss effect which manifests itself when the radius arms are set to a common axis is almost equally effective when they are at an angle to each other, as shown herein. This feature is so desirable that the inboard oscillating pivot blocks 54 and 57 are preferably of even more substantial radius than the pivot blocks at pivots 27 and 31. This is feasible because, at the inboard position, the greater weight acts on a shorter lever arm in relation to the base angular pivot.

It will be observed that the short arm 23 is really little more than a link element in the articulated segments of the radius arm structure, affording two pivot axes at right angles to each other. This is also true of the bifurcated lobar element 33 and its pivot disk 74.

Accessory equipment of any suitable type may, of course, be provided. In the interests of completeness, the drawings illustrate a heavy conductor 86, and a purely conventional curled-over sheet metal cord clip 87. The wire guard 88 and the flood lamp 89 are obviously not novel. Any suitable type of light may be employed, although, as indicated, a directional light beam is to be preferred. Indeed, the device of this invention has utility where any object is to be firmly and accurately positioned at a distance from a fixed support, and held in the desired position against vibration or shock.

I claim:

1. In an extensible lighting fixture of the type having articulated arm elements extending between a fixed base and a movable light receptacle, a pivotal mounting carried by the fixed base and incorporating structure affording an axis for an angular pivot, pivotal connections outboard of said angular pivot axis for segments of the articulated arm structure affording oscillating pivot axes for a plurality of oscillating pivots, all of which axes are normal to a plane containing the pivot axis first mentioned, the inboard segment of said articulated arm structure also being configured to rotate about said angular pivot axis, and mounting means connecting the outboard end of the arm structure to the light receptacle and providing a second angular pivot axis which parallels the same plane as the pivot axis first mentioned, regardless of the position of adjustment of said articulated arm structure.

2. Structure as defined in claim 1, in which each oscillating pivot incorporates a pair of solid pivot blocks of substantial radius and thickness, and a pivot in structure which passes through axially aligned arbors formed in both blocks and which has adjustable means for yieldingly varying the friction load imposed upon the blocks.

3. Structure as defined in claim 1, in which the mounting means for the light receptacle incorporates a pair of centrally-apertured pivot disks of substantial radius, and a pivot pin structure which passes through the apertures and has adjustable means for yieldingly varying the friction load imposed upon the disks.

4. Structure as defined in claim 3, wherein one of said disks is carried on a lobar element which incorporates one of the pivot blocks of the outboard oscillating pivot structure.

5. Structure as defined in claim 3, wherein the outermost of the pair of pivot disks referred to is secured to the light receptacle by spaced parallel web means rigidly mounting said receptacle at a fixed angle to the face of the disk.

6. Structure as defined in claim 1, wherein the inboard angular pivot comprises a headed pivot pin journalled in the base, a face clutch having a pair of clutch disks provided with radially extending ridges on their mating faces and being centrally bored to pass the pivot pin, a short arm mounted in fixed angular relation to one of the clutch disks and journalled on said pivot pin, and loading means reacting against the pivot pin for imposing a compressive force to secure the clutch plates yieldably together.

7. In an adjustable light holding fixture of the type which comprises articulated radius arm elements pivotally mounted at one end to a fixed base and carrying a receptacle for a light at the other end, means for mounting the receptacle which include a first disk element integrally connected to the receptacle by spaced-apart web means extending laterally from the receptacle and rigidly positioning said disk element at a fixed angle to the receptacle, a second disk element adapted to register with the disk element first named, link means pivotally connecting said second disk element to the outboard articulation of said radius arm, and pivot pin structure mounting said first disk element for rotation about a pivot axis common to that element and the second disk element, said pivot pin structure being accommodated in part between said spaced-apart web means.

8. Structure as defined in claim 7, in which the link means is bifurcated in a region intermediate the point of articulation with the radius arm and the back of said second disk element, and said pivot pin structure is accommodate in part between the legs of said bifurcation.

9. Structure as defined in claim 7, in which a helical spring is positioned to react between said pivot means and said disks to urge the disks toward each other.

10. In an adjustable light bracket assembly of the type having a light fixture, a supporting base, and a jointed radius arm pivotally interconnecting the fixture to the base, characterized in that (1) the pivotal connection at the base comprises spring-held interlocking clutch elements mounted for rotation about a pivot axis normal to the base, and pivot means mounting the inboard end of the radius arm for oscillation about a pivot axis normal to the clutch axis; (2) the jointed radius arm has pivot means mounting its jointed elements for oscillation about pivot axes parallel to that of the oscillating pivot at the base, and also has pivot means adjacent its outboard end providing for angular movement of the light fixture about an axis which is normal to the pivot axis at the outboard end of said radius arm.

References Cited by the Examiner

UNITED STATES PATENTS

| | | | |
|---|---|---|---|
| 502,601 | 8/93 | Anderson et al. | 248—276 X |
| 1,063,220 | 6/13 | Seamon | 248—276 X |
| 1,774,496 | 8/30 | Oishei | 248—278 |
| 2,440,873 | 5/48 | Popp et al. | 248—276 |
| 2,458,967 | 1/49 | Wiedenhoeft | 240—52 X |
| 2,466,722 | 4/49 | May | 248—276 |
| 2,572,231 | 10/51 | Woodward | 248—276 |
| 2,697,577 | 12/54 | Wolf | 248—278 |
| 2,956,768 | 10/60 | Livingston | 248—278 X |

FOREIGN PATENTS

| | | |
|---|---|---|
| 116,662 | 3/43 | Australia. |

NORTON ANSHER, *Primary Examiner.*

LAWRENCE CHARLES, *Examiner.*